United States Patent
Eckert et al.

(10) Patent No.: US 9,746,908 B2
(45) Date of Patent: Aug. 29, 2017

(54) PRUNING OF LOW POWER STATE INFORMATION FOR A PROCESSOR

(71) Applicant: Advanced Micro Devices, Inc., Sunnyvale, CA (US)

(72) Inventors: Yasuko Eckert, Bellevue, WA (US); Derek Hower, Bellevue, WA (US); Marc Orr, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 134 days.

(21) Appl. No.: 14/630,687

(22) Filed: Feb. 25, 2015

(65) Prior Publication Data
US 2016/0246360 A1 Aug. 25, 2016

(51) Int. Cl.
*G06F 1/32* (2006.01)
*G06F 9/46* (2006.01)

(52) U.S. Cl.
CPC .......... *G06F 1/3293* (2013.01); *G06F 1/3243* (2013.01); *G06F 1/3287* (2013.01); *G06F 9/46* (2013.01)

(58) Field of Classification Search
CPC .............................. G06F 1/323; G06F 9/3861
USPC ........ 713/300, 310, 320, 321, 322, 330, 323
See application file for complete search history.

(56) References Cited

U.S. PATENT DOCUMENTS

| | | | | |
|---|---|---|---|---|
| 7,315,952 B2* | 1/2008 | Wilcox | ..................... | G06F 1/26 307/35 |
| 2005/0273635 A1* | 12/2005 | Wilcox | ..................... | G06F 1/26 713/320 |
| 2008/0307244 A1* | 12/2008 | Bertelsen | .............. | G06F 1/3203 713/323 |
| 2009/0089562 A1* | 4/2009 | Schuchman | .......... | G06F 1/3203 712/228 |
| 2012/0144220 A1* | 6/2012 | Mearns | ................. | G06F 1/3228 713/323 |
| 2012/0303990 A1* | 11/2012 | Nanda | .................... | G06F 1/3228 713/324 |
| 2014/0258757 A1* | 9/2014 | Schuchman | .......... | G06F 1/3203 713/323 |
| 2014/0281380 A1* | 9/2014 | Sodhi | .................. | G06F 9/30123 712/30 |
| 2015/0095676 A1* | 4/2015 | Puthiyedath | .......... | G06F 1/3234 713/323 |
| 2015/0178091 A1* | 6/2015 | Offen | .................... | G06F 9/3861 712/228 |

* cited by examiner

*Primary Examiner* — Vincent Tran

(57) ABSTRACT

A processor prunes state information based on information provided by software, thereby reducing the amount of state information to be stored prior to the processor entering a low-power state. The software, such as an operating system or application program executing at the processor, indicates one or more registers of the processor as storing data that is no longer useful. When preparing to enter the low-power state, the processor omits the indicated registers from the state information stored to memory.

18 Claims, 6 Drawing Sheets

US 9,746,908 B2

PRUNING OF LOW POWER STATE INFORMATION FOR A PROCESSOR

BACKGROUND

Field of the Disclosure

The present disclosure relates generally to processors and more particularly to low power states for processors.

Description of the Related Art

An important objective for modern processor designs is minimizing consumption of power. Accordingly, a processor can employ one or more low-power states, wherein the processor consumes less power and performs at a reduced rate of operation relative to an active state. For example, an x86 processor employs a set of power states, referred to as C-states, with the C0 state corresponding to a fully active state and states C1-C6 corresponding to low-power states. For some low-power states (e.g., the C6 state) the processor performs minimal or no operations. In order to ensure proper execution of software at the processor, prior to entering such a low-power state the processor can save state information stored at one or more registers of the processor to memory. Upon exiting the low-power state, the processor restores the state information to the one or more registers, allowing the software to continue execution from the point where the low-power state was entered. However, the transfer of state information to and from memory consumes power, reducing the efficacy of the low-power state.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
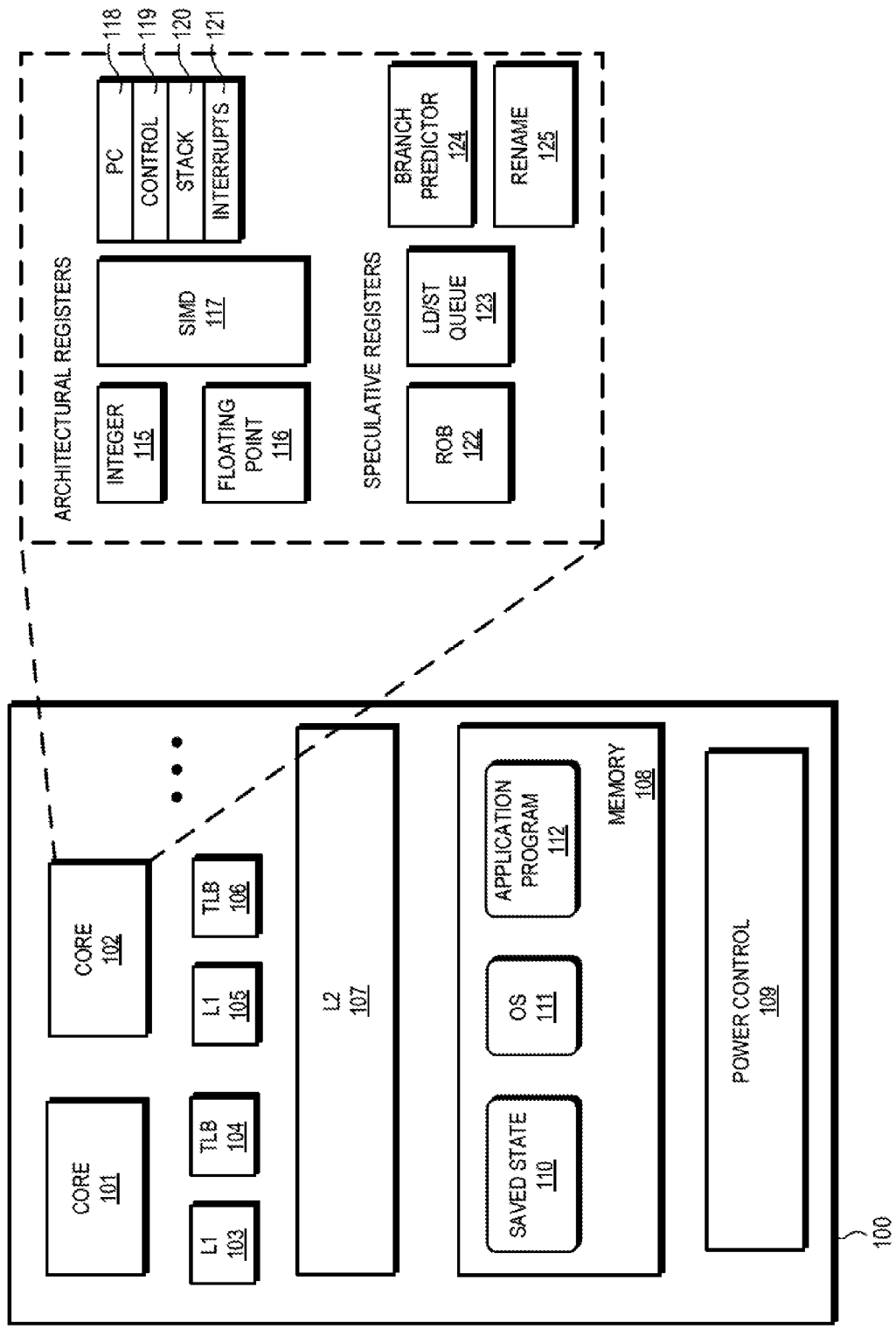
FIG. 1 is a block diagram of a processor that prunes state information based on software hints or other information in accordance with some embodiments.

FIGS. 1-8 illustrate techniques for pruning state information at a processor based on information provided by software executing at the processor or based on other information, thereby reducing the amount of state information to be stored prior to the processor entering a low-power state. The software, such as an operating system or application program executing at the processor, or a hardware module indicates one or more registers of the processor as storing "dead data" (that is, data that is no longer useful). When preparing to enter the low-power state, the processor omits the indicated registers from the state information stored to memory. This reduces the amount of state information transferred to and from memory, thereby reducing the power overhead for entering and exiting the low-power state and reducing power consumption at the processor.

To illustrate, in some scenarios when the processor is requested to enter the low-power state, a processor core will have completed executing a scheduled program thread. Accordingly, the state information stored at the registers of the processor core store dead data that is no longer useful for execution of the program thread. Conventionally, when entering the low-power state (e.g., a C6 state) the processor would transfer state information from the registers of all processor cores, including the dead data, to memory and, upon exiting the low-power state, would transfer all of the state information, including the dead data, from memory to the corresponding registers. In some embodiments of the techniques described herein, an operating system (OS) executing at the processor indicates which processor cores have completed thread execution and therefore store dead data. In response, the processor does not store the state information for the indicated cores when preparing to enter the low-power state, thereby reducing the amount of state information transferred to and from memory.

In some embodiments, the OS can indicate, for a processor core concurrently executing multiple threads, which of the threads have completed execution. When the processor is preparing to enter the low-power state, it identifies the registers of the processor core that store data for the indicated threads and does not transfer the state information in these identified registers to memory, thereby reducing the amount of transferred state information.

The registers of a processor core that store dead data, in some embodiments, can be indicated by an executing application program, rather than the OS. For example, during compilation of the application program, a compiler can identify when a register of a processor core stores dead data and in response can insert an instruction to negate a "live bit" of the register. When preparing to enter the low-power state the processor identifies which processor core registers have negated live bits and does not transfer the state information at the identified registers to memory, thus reducing the amount of stored state information.

In some embodiments, in response to identifying that a processor core register stores dead data at a given point in a program flow, the compiler can mark an instruction at the identified point. When preparing to enter the low-power state, the processor can identify whether a marked instruction is scheduled for execution within a threshold number of cycles. If so, the processor can wait to enter the low-power state until the marked instruction has been reached. This increases the amount of dead data in the processor core registers, thereby reducing the amount of state information to be transferred to and from memory.

Upon exiting the low-power state, the processor can execute operations to populate one or more of processor caches, translation lookaside buffers (TLBs), and branch prediction buffers for execution of a scheduled program thread. This facilitates completion of the program thread execution, allowing the processor to return to the low-power state more quickly (sometimes referred to as a "race to idle") and reducing overall power consumption. To illustrate, in some embodiments, the OS executing at the processor can identify that a thread is scheduled for execution at a processor core within a threshold number of cycles after the processor exits the low-power state. In response, upon exiting the low-power state and prior to the time when the thread is scheduled for execution, the processor executes a portion of the program thread but prevents the storage of any data from the program thread to memory. This causes the processor core cache, TLB, and branch prediction buffers to be populated with the data that will be used by the program thread. Accordingly, when the program thread is executed at its scheduled time, this data is already present in the cache, TLB, and branch prediction buffers, thereby reducing the time required to execute the program thread.

FIG. 1 illustrates a processor 100 in accordance with some embodiments. The processor 100 is a general purpose processor, special-purpose processor (e.g., a graphics processor), or other type of processor configured to execute instructions organized in the form of computer programs. Accordingly, the processor 100 can be incorporated into any of a variety of electronic devices, including a desktop computer, laptop computer, server, tablet, smartphone, gaming console, and the like. To facilitate execution of instructions, the processor 100 includes a plurality of processor cores (e.g., processor cores 101 and 102). Each processor core includes one or more instruction pipelines including a corresponding fetch stage to fetch instructions, a decode stage to decode each fetched instruction into one or mode corresponding operations, and one or more execution units to execute the operations.

In some embodiments, the computer programs executed at the processor 100 can be divided (by the computer program itself, the OS, or other module) into one or more program threads, with each program thread executed at one of the processor cores. In some embodiments, a processor core can concurrently execute two or more program threads by alternating execution of instructions or operations from the program threads.

Each processor core includes a plurality of registers to store information to prepare and execute instructions. The registers can generally be divided into one of two classes based on the type of data stored at the register: architectural registers and speculative registers. The architectural registers store data for operations being executed at the processor core, while the speculative registers store data to assist in speculative retrieval and execution of instructions. In the illustrated example of FIG. 1, the processor core 102 includes architectural registers such as integer registers 115 to store data for integer arithmetic operations, floating point registers 116 to store data for floating point arithmetic operations, SIMD registers 117 for graphics processing operations, a program control (PC) register 118 to store an address of the instruction being executed (or scheduled to be executed) at the processor core, a control register 119 to store control information for the processor core, stack registers 120 to store a data stack, and interrupt registers 121 to store data associated with interrupts to the processor core. In addition, the processor core 101 includes speculative registers such as a reorder buffer (ROB) 122 to store data to facilitate scheduling of instructions for execution, a load/store queue 123 to store data for load and store operations, a branch predictor buffer 124 to store data for branch predictions, and a rename buffer 125 to store data indicating the registers targeted by operands of instructions being executed at the processor core. The other processor cores of the processor 100 include similar architectural and speculative registers.

The data stored at the architectural and speculative registers is generally referred to herein as state information of the corresponding processor core. As described further herein, the state information, or a portion thereof, of a processor core can be stored at a given point. Upon subsequent restoring of the saved state information, the processor core can continue execution of instructions from the given point. Thus, storing of the state information allows execution of a program thread at a processor core to be suspended for a period of time without affecting the results of executing the thread. As described further herein, this allows the processor 100 to be placed in a low-power state wherein execution of threads at one or more of its processor cores is suspended.

To assist the processor cores in executing instructions, the processor 100 includes, for each processor core, a corresponding level 1 ("L1") cache and TLB. For example, the processor core 101 is associated with the L1 cache 103 and TLB 104, while the processor core 102 is associated with the L1 cache 105 and the TLB 106. Each L1 cache is employed data (e.g., instructions, operand data) likely to be used by the associated processor core in the near future. Each TLB is employed to store address translation information (e.g., virtual memory addresses and corresponding physical memory addresses) likely to be used by the associated processor core in the near future. In addition, the processor 100 includes a number of resources shared between two or more of the processor cores, including an L2 cache 107, memory 108, and a power control module 109. The L2 cache 107 stores data for multiple processor cores that is likely to be used by one or more of the processor cores in the near future. The memory 108 stores all data for the processor 100, and transfers data to and from the L2 cache 107 and L1 caches in response to memory access requests.

The power control module 109 is generally configured to control the power state of the processor 100. In some embodiments, the power control module 109 receives signals from software executing at the processor 100, from performance monitors (not shown) or other hardware modules of the processor 100, or a combination thereof, wherein the signals indicate a requested power mode for the processor 100. For purposes of simplicity of description, the processor 100 will be described with respect to two power modes: an active mode wherein the processor cores of the processor 100 are executing, or prepared to execute, instructions, and a low-power mode wherein the processor cores do not execute instructions and are not able to retain state information at the architectural and speculative registers. However, it will be appreciated that in some embodiments the processor 100 can be placed in any of a plurality of low-power modes (e.g., modes C1-C6), including low-power modes wherein the processor cores are able to execute instructions at a reduced rate relative to the active mode. In addition, in some embodiments the processor 100 can place only a portion of the processor cores in a particular low-power mode. For example, in some embodiments the processor cores 101 and 102 can be placed in the low-power mode wherein they are not able to execute instructions or retain state information, while other processor cores of the processor 100 are placed in the active mode or in a different low-power mode.

In response to receiving a request that the processor 100 enter the low-power mode, the power control module 109 signals the processor cores to save data at their respective architectural and speculative registers at the memory 108. This saved state information is illustrated at FIG. 1 as saved state 110. In some embodiments, the power control module 109 prunes the data to be saved, so that only a subset of the architectural and speculative registers of the processor 100 is saved. As used herein, a subset of registers refers to some, but not all, of the registers of a given set. For example, if the set of registers is the set of all architectural registers for a given processor core, a subset of those registers includes some, but not all, of the architectural registers for the processor core. To prune the data, the power control module 109 identifies, based on information received from software executing at the processor 100, a subset of the architectural and speculative registers that store data that, for any of a number of reasons, is not to be stored. For purposes of description, these registers are referred to herein as "dead" registers and the registers indicated as storing state information that is to be saved are referred to herein as "live" registers. The power control module 109 transfers to the saved state 110 only the data in the live registers, and does not transfer data from the dead registers. This reduces the amount of data transferred to the saved state 110, resulting in fewer transfer operations and a reduction in the power required to effect the transfer of data. Thus, the overhead to enter the low-power state is reduced, allowing the low-power state to be entered more frequently and conserving more power at the processor 100.

To illustrate, in some embodiments the processor 100 executes an OS 111 that can be stored at the memory 108. The OS 111 schedules program threads for execution at the processor cores of the processor 100. Accordingly, the OS 111 is aware (that is, it keeps track of data indicating) which of the processor cores are not executing a thread. When the OS 111 issues a request to enter the low-power state to the power control module 109, it can also indicate which of the processor cores are not executing a thread. The power control module 109 treats the architectural registers and speculative registers of these cores as dead registers and does not transfer data from those registers to the saved state 110 when preparing to enter the low-power state. Because the corresponding processor cores are not executing threads, the omission of their state information from the saved state 110 does not affect the performance or results of software executing at the processor 100.

In some embodiments, the OS 111 can schedule multiple threads for concurrent execution at a single processor core. This results in different registers of the processor core storing data for different program threads. Further, the multiple threads can complete execution at different times. When the OS 111 issues a request to enter the low-power state to the power control module 109, it can also indicate which registers of each processor core store data for threads that have completed execution. The power control module 109 treats the identified registers cores as dead registers and does not transfer data from those registers to the saved state 110 when preparing to enter the low-power state.

The processor 100 executes, at one or more of its processor cores, program threads of an application program 112. The program threads can include instructions to indicate (e.g., via a designated register bit) when a register stores data that is not going to be used by the program thread. Such data is referred to herein as "dead" data, while data that is going to be used is referred to as "live" data. To illustrate via an example, an instruction in a program thread may load data into registers R1 and R2, then another instruction adds the data at register R2 to the data in register R1 with the result placed in register R1. After the addition, the data at register R2 is not used by other instructions of the program thread, and is therefore dead data. In response to receiving a request to enter the low-power state, the power control module 109 can identify which registers of the processor cores have been designated by the executing program threads as storing dead data. The power control module 109 treats the identified registers cores as dead registers and does not transfer data from those registers to the saved state 110 when preparing to enter the low-power state. That is, the power control module 109 transfers data only from those registers indicated as having live data. Because the dead data at the dead registers is not going to be used by a program thread, omitting it from the saved state 110 does not affect the performance or results of software executing at the processor 100.

In some embodiments, a program thread can include one or more markers placed in the program thread to indicate a point in the program flow where a threshold number of registers of the corresponding processor core are dead registers. In response to receiving a request to enter the low-power state, the power control module 109 can identify whether the marker will be reached, within a threshold number of cycles, by the processor core executing the program thread. If so, the power control module 109 can delay transferring state information from the processor core to the saved state 110, and delay entering the low-power mode, until the marker is reached. This increases the number of dead registers and therefore reduces the amount of data transferred to the saved state 110. In some embodiments, the instructions to indicate dead registers and the markers can be automatically inserted by a compiler during compilation of the application program 112.

Upon receiving a request to exit the low-power mode (e.g., from an interrupt, from the OS 111, from hardware based on expiration of a timer, and the like), the power control module 109 returns the processor cores to the active state and transfers the data at the saved state 110 to the corresponding registers of the processor cores so that execution of program threads can be restarted at or near the point when the low-power state was entered. Conventionally, after exiting the low-power state the L1 caches, TLBs, and branch predictor buffers of the processor 100 are in an unknown state (that is, the data stored at these modules is unknown or indeterminate). Accordingly, when execution of program threads is restarted, these modules are repopulated in the course of executing the program threads. In some embodiments, the OS 111 can, in response to the processor cores exiting the low-power state, cause execution a portion of a program thread that is scheduled for subsequent execution. For purposes of description, this execution of the portion of the program thread is referred to as "provisional execution." The provisional execution of the portion of the program thread populates the L1 cache, TLB, and branch prediction buffers for the processor core. However, during provisional execution the OS 111 controls the processor core so that it does not store data from the processor core registers to memory (include the L1 and L2 caches and the memory 108). Thus, when the program thread is executed at its scheduled time, the L1 cache, TLB, and branch prediction buffers are already populated, allowing the program thread to complete execution more quickly. Further, because the provisional execution did not result in data being stored to memory, the provisional execution does not affect the results of executing the program thread at its normally scheduled time, ensuring proper execution of the program thread.

In some embodiments, prior to the processor 100 being placed in the low-power state, the OS 111 causes the TLBs of the processor cores to be saved to the memory 108. In response to the processor 100 exiting the low-power state, the OS 111 restores the saved TLB data to the corresponding TLBs. Thus, when execution of the program threads is restarted, the TLBs will be populated as they were when the low-power mode was entered, the program threads can complete execution more quickly.

Figure 2:
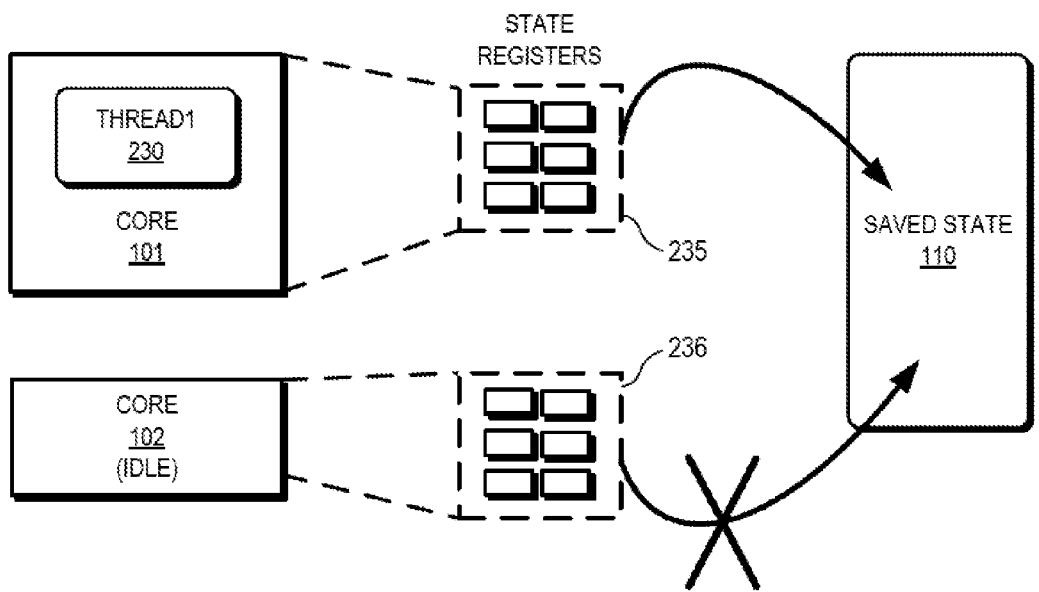
FIG. 2 is a diagram illustrating the processor of FIG. 1 saving a subset of available state information based on active processor cores in accordance with some embodiments.

FIG. 2 illustrates a diagram depicting an example of the processor 100 storing data for only a subset of registers when preparing to enter the low power state in accordance with some embodiments. In the illustrated example, when the OS 111 issues a request to place the processor 100 in the low-power state, the processor core 101 is in the course of executing a program thread 230, while the processor core 102 is idle, in that it is not executing a program thread. Accordingly, in preparing to place the processor 100 in the low-power state, the power control module 109 transfers data from the architectural registers and speculative registers of the processor core 101 (designated registers 235 at FIG. 2) to the saved state 110. Further, the power control module 109 does not transfer data the architectural registers and speculative registers of the processor core 102 (designated registers 236 at FIG. 2) to the saved state 110, as the registers 236 do not store data to be used by an executing program thread.

Figure 3:
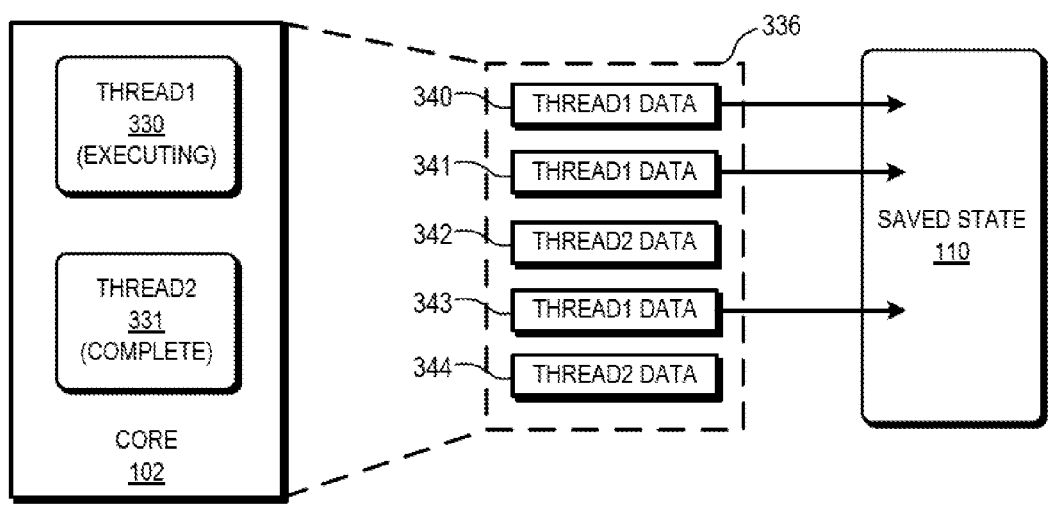
FIG. 3 is a diagram illustrating the processor of FIG. 1 saving a subset of available state information based on active program threads in accordance with some embodiments.

FIG. 3 illustrates a diagram depicting an example of the processor 100 storing data for only a subset of registers of the processor core 102 when preparing to enter the low power state in accordance with some embodiments. In the illustrated example, when the OS 111 issues a request to place the processor 100 in the low-power state, the processor core 102 has previously been concurrently executing a program thread 330 and a program thread 331. The program thread 330 is still being executed at the processor core 102, while the program thread 331 has completed execution at the processor core 102. Further, in the illustrated example the processor core 102 includes registers 340, 341, 342, 343, and 344, each storing data for a corresponding thread. In particular, registers 340, 341, and 343 store data for program thread 330, while registers 342 and 344 store data for program thread 331. Accordingly, in preparing to place the processor 100 in the low-power state and based on information provided by the OS 111, the power control module 109 transfers data from registers 340, 341, and 343 to the saved state 110, because those registers store data for a thread that is still in the course of execution. Further, based on information provided by the OS 111 the power control module 109 does not transfer data the registers 342 and 344, as these registers 236 store data for a thread that has completed execution at the processor core 102.

Figure 4:
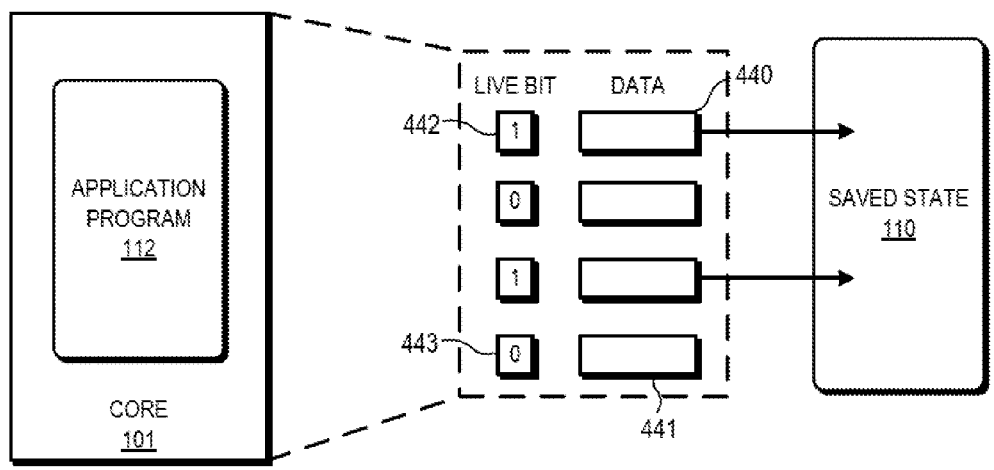
FIG. 4 is a diagram illustrating the processor of FIG. 1 saving a subset of available state information based on state registers indicated as storing live data in accordance with some embodiments.

FIG. 4 illustrates a diagram depicting an example of the processor 100 storing data for only a subset of registers of the processor core 101 when preparing to enter the low power state in accordance with some embodiments. In the illustrated example, the processor core 101 includes a set of registers, such as registers 440 and 441. Each register includes a corresponding live bit indicating whether the data at the corresponding register is a live register (stores live data) or a dead register (stores dead data). For example, live bit 442 is associated with register 440 and is in an asserted state, indicating that register 440 is a live register. Live bit 443 is associated with register 441 and is not in an asserted state, indicating that register 441 is a dead register. The state of each live bit is set by instructions of one or more program threads of the application program 112 as the program threads are executed. During compilation of the application program 112, the compiler identifies when each register transitions from a live state to a dead state (that is, when data at the register is no longer to be used by the program thread) and from a dead state to a live state (that is, when dead data at the register is replaced by live data). The compiler automatically inserts instructions in the application program 112 to set the live bit for each register to indicate the live or dead state of the data stored at the register.

In response to receiving a request to place the processor 100 in the low-power state, the power control module 109 identifies registers that have asserted live bits and transfers the data from the identified registers to the saved state 110. The power control module 109 does not transfer data from registers having negated live bits (that is, the registers that store dead data). For example, the power control module 109 transfers the data from register 440, but does not transfer the data from register 441. Thus, only live data is transferred to the saved state 110, reducing the amount of data transferred and thereby conserving power at the processor 100.

Figure 5:
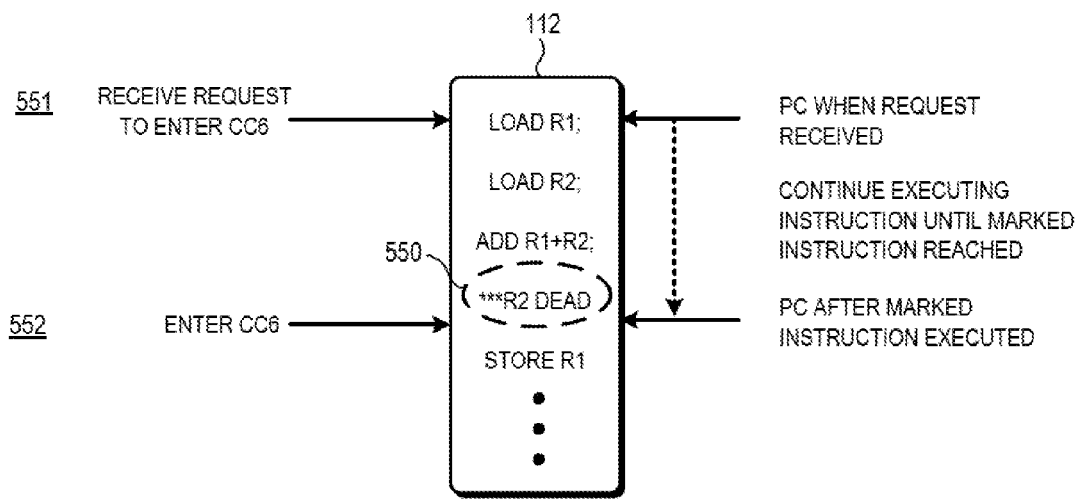
FIG. 5 is a diagram illustrating the processor of FIG. 1 executing program instructions until a marked instruction is reached to allow for pruning of state information in accordance with some embodiments.

FIG. 5 is a diagram illustrating the processor 100 continuing to execute instructions after receiving a request to enter a low-power mode until a marked instruction is reached in accordance with some embodiments. In the illustrated example, at a time 551 the power control module 109 receives a request to place the processor 100 in the low-power mode. The power control module 109 identifies, based on information provided by the OS 111 or the application program 112, that there is a marked instruction 550 that is expected to be executed within a threshold number of cycles of the processor 100. This marked instruction 550 has previously been generated by a compiler of the application program 112. For example, the compiler can automatically generate the marked instruction 550 in response to determining that, at the point of the marked instruction 550 in the program flow of the application program 112, a threshold number of registers of the processor 100 are expected to store dead data.

In response to the power control module 109 identifying that the marked instruction is expected to be reached in the threshold number of cycles, the power control module 109 delays transferring data from the registers of the processor core to the saved state 110. The program thread thus continues running until time 552, when the marked instruction has been reached by the processor core. The power control module 109 identifies the live registers of the processor core and transfers data from the live registers to the saved state 110. In addition, the power control module 109 does not transfer data from dead registers of the processor core, as described above with respect to FIG. 4. Thus, by allowing the program thread to continue execution until time 552 when the marked instruction 550 is reached, the power control module 109 causes the number of dead registers to be increased, thereby reducing the amount of data to be transferred to the saved state 110.

Figure 6:
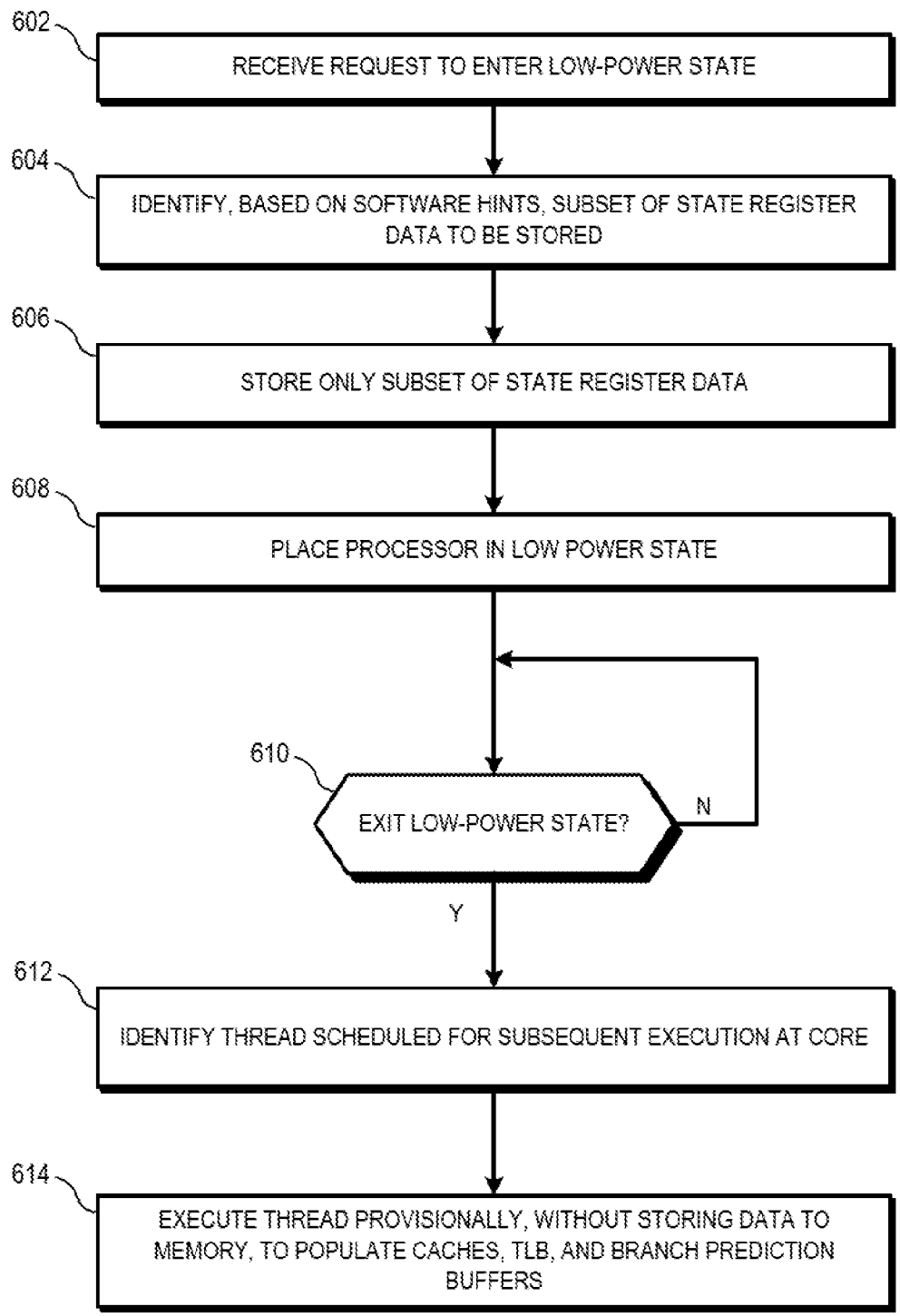
FIG. 6 is a flow diagram of a method of pruning state information for storage prior to entering a low-power state at a processor in accordance with some embodiments.

FIG. 6 is a flow diagram of a method 600 of pruning state information for storage prior to entering the low-power state at the processor 100 in accordance with some embodiments. At block 602 the power control module 109 receives a request from the OS 111 to place the processor 100 in the low-power state. In response, at block 604 the power control module 109 identifies a subset of the registers of the processor cores that store live data. The power control module 109 makes this identification based on information, referred to as "hints," from software executing at the processor 100, such as the OS 111, the application program 112, or a combination thereof.

At block 606, the power control module 109 transfers data only from the subset of registers of the processor 100 identified as having live data to the saved state 110 at the memory 108. At block 608 the power control module 109 places the processor cores of the processor 100 in the low-power state. Decision block 610 represents a loop, wherein the power control module 109 maintains the processor cores in the low-power state until receiving a request to exit the low-power state. In response to receiving the request, the power control module 109 places the processor cores in the active state and the method flow moves to block 612. At block 612 the OS 111 identifies a program thread scheduled for future execution at the processor core 101. In response, at block 614 the OS 111 provisionally executes at least a portion of the identified program thread to populate the L1 cache 103, the TLB 104, and the branch predictor buffer for the processor core. Later (not illustrated by the method 600), the processor core 101 executes the program thread as scheduled, using the data at the L1 cache 103, the TLB 104, and the branch predictor buffer previously populated by the provisional execution.

Figure 7:
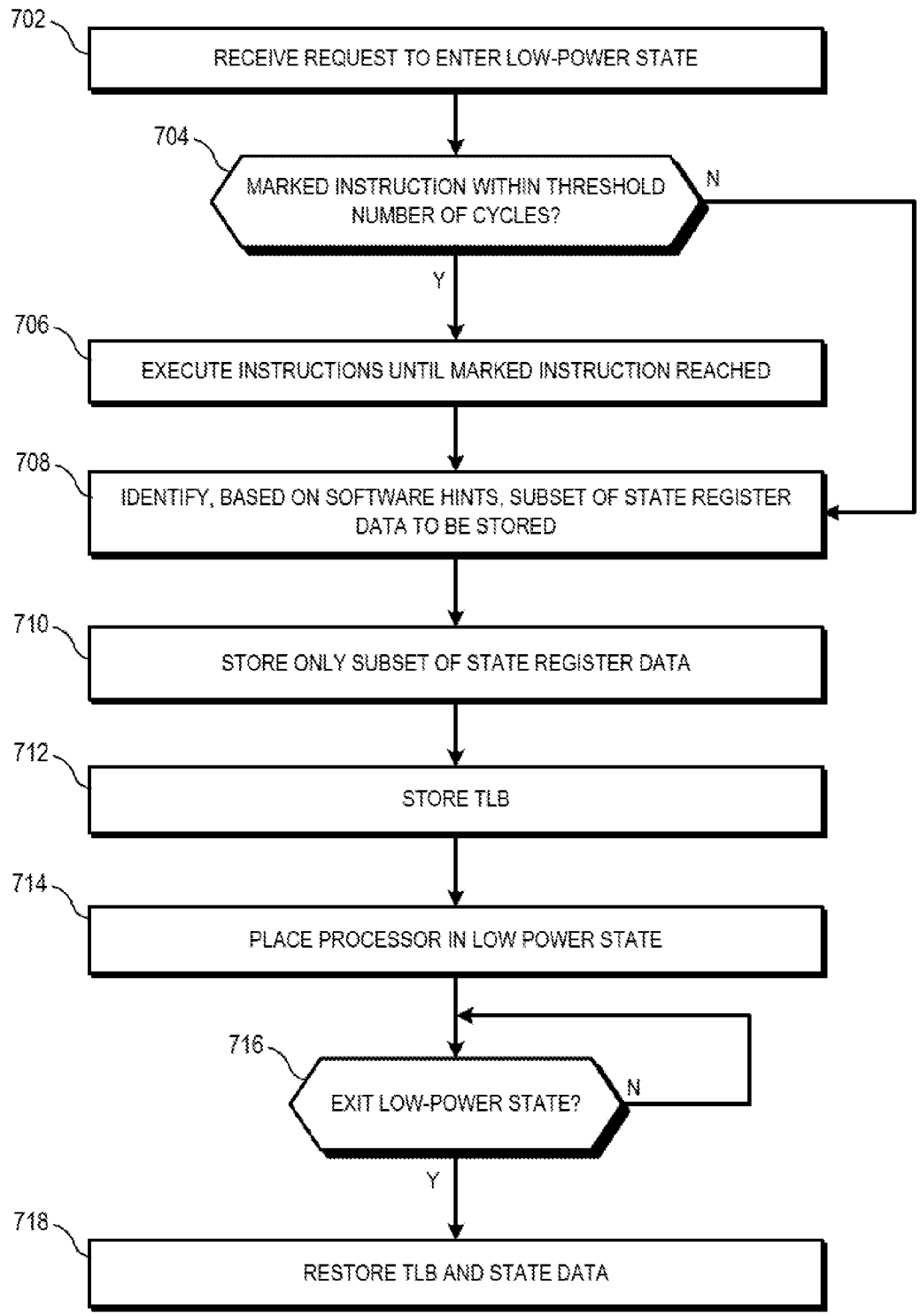
FIG. 7 is a flow diagram of a method of executing program instructions until a marked instruction is met prior to entering a low-power state at a processor in accordance with some embodiments.

FIG. 7 is a flow diagram of a method of executing program instructions until a marked instruction is met prior to entering a low-power state at the processor 100 in accordance with some embodiments. At block 702 the power control module 109 receives a request from the OS 111 to place the processor 100 in the low-power state. In response, at block 704 the power control module 109 determines if a program thread executing at the processor core 102 includes a marked instruction that can be executed within a threshold number of cycles. If not, the method flow moves to block 708, described below. If the marked instruction can be reached in the threshold number of cycles, the method flow moves to block 706 and the power control module 109 waits to transfer data from registers of the processor core 102 until the marked instruction has been reached.

At block 708, the power control module 109 identifies a subset of the registers of the processor cores that store live data. The power control module 109 makes this identification based on information, referred to as "hints", from software executing at the processor 100, such as the OS 111, the application program 112, or a combination thereof. At block 710, the power control module 109 transfers data only from the subset of registers of the processor 100 identified as having live data to the saved state 110 at the memory 108. At block 712 the OS 111 causes the contents of the TLB 106 to be stored at the memory 108. At block 714 the power control module 109 places the processor cores of the processor 100 in the low-power state. Decision block 716 represents a loop, wherein the power control module 109 maintains the processor cores in the low-power state until receiving a request to exit the low-power state. In response to receiving the request, the power control module 109 places the processor cores in the active state and the method flow moves to block 718. At block 718 the power control module 109 restores the stored TLB data and state information stored at the saved state 110 to the corresponding registers of the processor core 102. The processor core 102 is thus prepared to continue execution of its scheduled program threads.

In some embodiments, the apparatus and techniques described above are implemented in a system comprising one or more integrated circuit (IC) devices (also referred to as integrated circuit packages or microchips), such as the processor described above with reference to FIGS. 1-7. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 8:
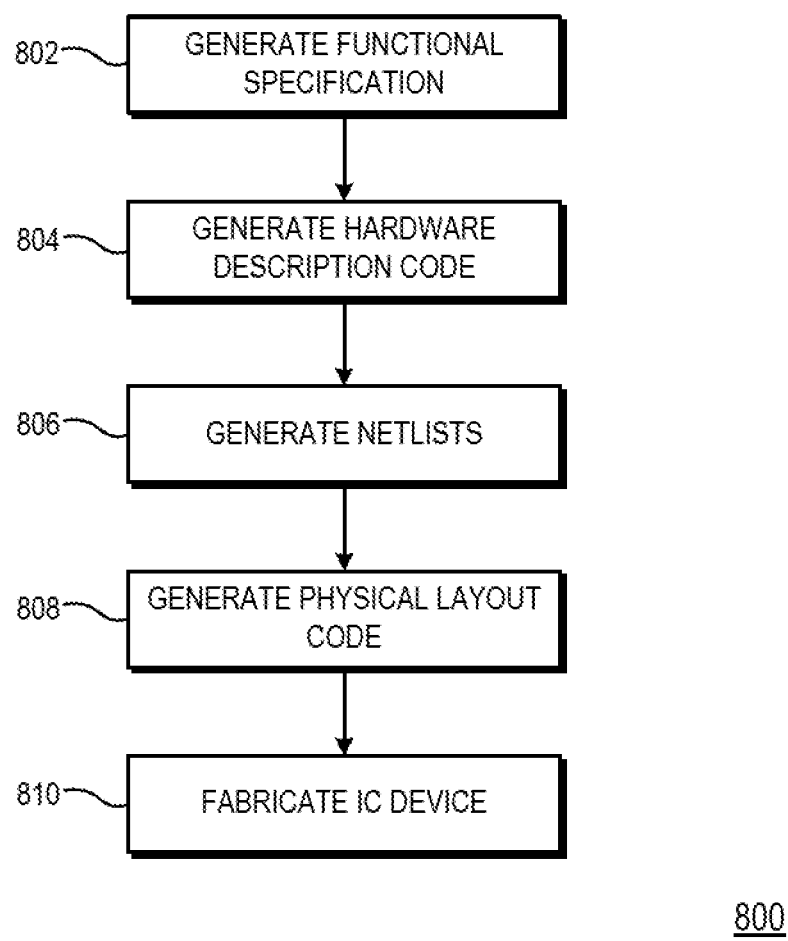
FIG. 8 is a flow diagram illustrating a method for designing and fabricating an integrated circuit device implementing at least a portion of a component of a processing system in accordance with some embodiments.

FIG. 8 is a flow diagram illustrating an example method 800 for the design and fabrication of an IC device implementing one or more aspects in accordance with some embodiments. As noted above, the code generated for each of the following processes is stored or otherwise embodied in non-transitory computer readable storage media for access and use by the corresponding design tool or fabrication tool.

At block 802 a functional specification for the IC device is generated. The functional specification (often referred to as a micro architecture specification (MAS)) may be represented by any of a variety of programming languages or modeling languages, including C, C++, SystemC, Simulink, or MATLAB.

At block 804, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, SystemVerilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 806 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 808, one or more EDA tools use the netlists produced at block 806 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 810, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving at a processor information indicating a first subset of state information is not designated for storage, the first subset of state information indicating a state of a first processor core of the processor;
   in response to receiving at the processor a request for a portion of the processor to enter a low-power state, storing a second subset of state information at the processor without storing the first subset; and
   placing the portion of the processor in the low-power state;
   determining a portion of a program thread scheduled to be executed at the processor after the portion of the processor has exited the low-power state; and
   in response to exiting the low-power state, executing the portion of the program thread at the processor without storing state information for the portion of the program thread at a memory of the processor.

2. The method of claim 1, further comprising:
   generating the information indicating the first subset of state information is not designated for storage in response to identifying that the first processor core is not executing a program thread.

3. The method of claim 1, further comprising:
executing a plurality of program threads at the first processor core; and
in response to identifying that a program thread of the plurality of program threads has completed execution at the first processor core:
identifying a plurality of registers of the first processor core storing state information associated with the first program thread; and
indicating via the information that the first subset includes the state information stored at the plurality of registers.

4. The method of claim 1, wherein executing the portion of the program thread comprises populating a translation lookaside buffer of the processor for subsequent use.

5. The method of claim 1, wherein executing the portion of the program thread comprises populating a cache of the processor for subsequent use.

6. The method of claim 1, further comprising:
in response to receiving the request for the portion of the processor to enter the low-power state, storing contents of a translation lookaside buffer (TLB) of the processor; and
in response to exiting the low-power state, restoring the stored contents to the TLB.

7. The method of claim 1, further comprising:
in response to identifying that a register of the processor stores data that is not be used by a program thread, indicating via the information that the first subset includes the data stored at the register.

8. The method of claim 1, further comprising:
in response to receiving at the processor the request for the portion of the processor to enter the low-power state:
identifying a marked instruction in a program thread to be reached within a threshold number of cycles of the processor;
executing the program thread until the marked instruction is reached; and
placing the portion of the processor in the low-power state in response to reaching the marked instruction, wherein the portion of the processor includes only live registers.

9. A method, comprising:
in response to receiving at a processor a request to place a portion of the processor in a low-power state:
identifying a marked instruction in a program thread to be reached within a threshold number of cycles of the processor;
executing the program thread until the marked instruction is reached; and
placing the portion of the processor in the low-power state in response to reaching the marked instruction, wherein the portion of the processor includes only live registers.

10. The method of claim 9, further comprising:
in response to identifying that a register of the processor stores data that is not to be used by the program thread, omitting the register from a set of registers of the processor; and
storing state information at the set of registers for use after the portion of the processor exits the low-power state.

11. A processor, comprising:
a first processor core;
a plurality of registers to store state information for the first processor core; and
a power control module to:
receive information indicating a first subset of the state information of the processor is not designated for storage;
in response to receiving a request for a portion of the processor to enter a low-power state, store a second subset of the state information without storing the first subset based on the received information;
identify a marked instruction in a program thread to be reached within a threshold number of cycles of the processor;
execute the program thread until the marked instruction is reached; and
place the portion of the processor in the low-power state in response to reaching the marked instruction, wherein the portion of the processor includes only live registers.

12. The processor of claim 11, wherein the processor is to:
in response to identifying that a second processor core is not executing a program thread, indicate via the information that the first subset includes state information for the second processor core.

13. The processor of claim 11, wherein the processor is to:
execute a plurality of program threads at second processor core; and
in response to identifying that a first program thread of the plurality of program threads has completed execution at the second processor core:
identifying a subset of the plurality of registers of the second processor core storing state information associated with the first program thread; and
indicating via the information that the first subset includes the state information stored at the subset of the plurality of registers.

14. The processor of claim 11, wherein the processor is to:
determine a portion of a program thread scheduled to be executed at the processor after the portion of the processor has exited the low-power state; and
in response to exiting the low-power state, execute the portion of the program thread at the processor without storing state information for the portion of the program thread at memory associated with the processor.

15. The processor of claim 14, wherein the processor is to execute the portion of the program thread to populate a translation lookaside buffer for subsequent use.

16. The processor of claim 14, wherein the processor is to execute the program thread to populate a cache of the processor for subsequent use.

17. The processor of claim 11, wherein the processor is to:
in response to receiving the request for the portion of the processor to enter the low-power state, store contents of a translation lookaside buffer (TLB) of the processor; and
in response to exiting the low-power state, restore the stored contents to the TLB.

18. The processor of claim 11, wherein the processor is to:
in response to identifying that a register of the plurality of registers stores data that is not be used by a program thread, indicating via the information that the first subset includes the data stored at the register.

* * * * *